W. G. FERGUSON.
CONTROL SYSTEM FOR VALVES AND THE LIKE.
APPLICATION FILED MAY 11, 1917.

1,336,515.

Patented Apr. 13, 1920.
2 SHEETS—SHEET 1.

Inventor
W. G. Ferguson
by Thurston & Kwis
attys.

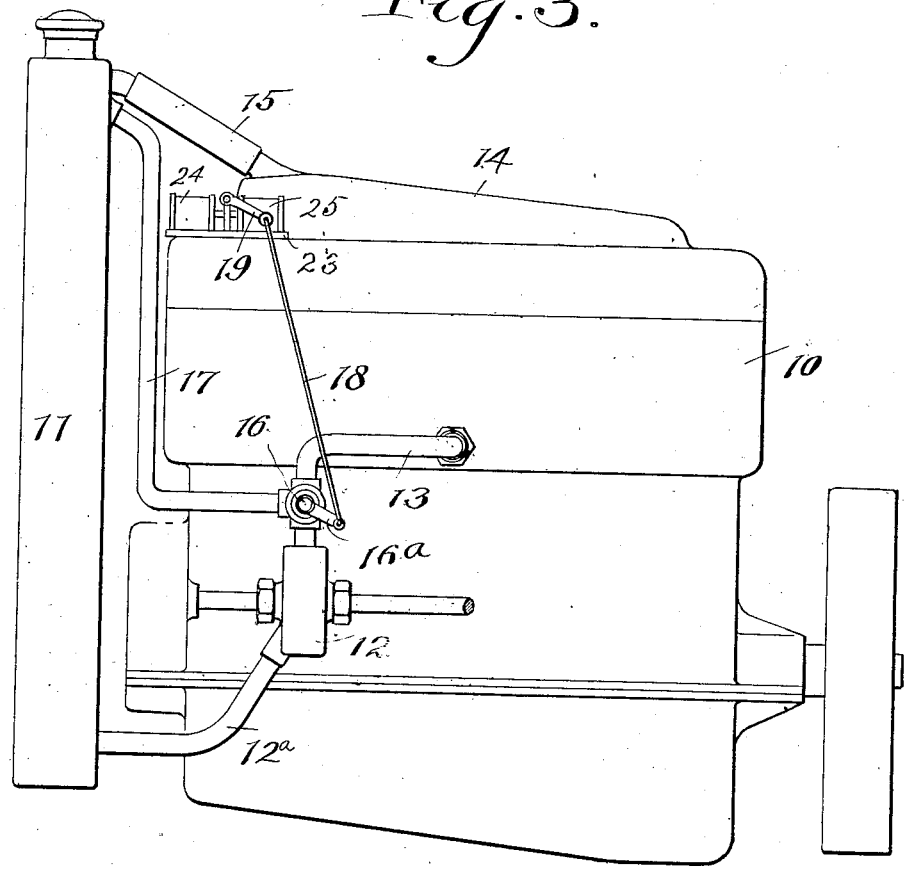

UNITED STATES PATENT OFFICE.

WILLIS G. FERGUSON, OF CLEVELAND, OHIO.

CONTROL SYSTEM FOR VALVES AND THE LIKE.

1,336,515.             Specification of Letters Patent.     Patented Apr. 13, 1920.

Application filed May 11, 1917. Serial No. 167,905.

*To all whom it may concern:*

Be it known that I, WILLIS G. FERGUSON, a citizen of the United States, residing at Cleveland, in the county of Cuyahoga and State of Ohio, have invented a certain new and useful Improvement in Control Systems for Valves and the like, of which the following is a full, clear, and exact description.

This invention relates to an electrical controlling system for valves and the like, and has for its principal object the provision of a controlling device or system which controls in an effective manner a valve or other member for controlling the flow of a medium such as a liquid or a gas.

A further object is to provide means whereby the valve, or equivalent member, is controlled electrically with a minimum expenditure of electrical energy, and whereby sparking is minimized at the circuit making and breaking contacts.

A still further object is to provide an efficient means for controlling the temperature of the medium flowing through a circuit, such for example as the water cooling system of an internal combustion engine.

The invention may be briefly summarized as consisting in certain novel details of construction and combinations and arrangements of parts which will be described in the specification and set forth in the appended claims.

Figure 1:
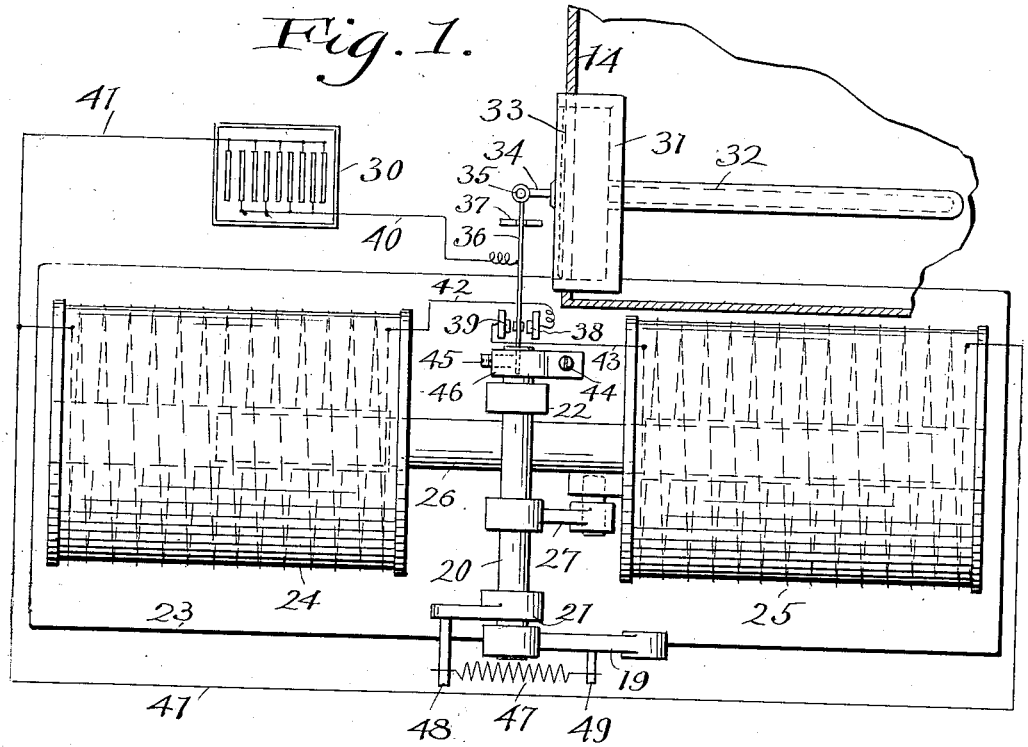
Figure 2:
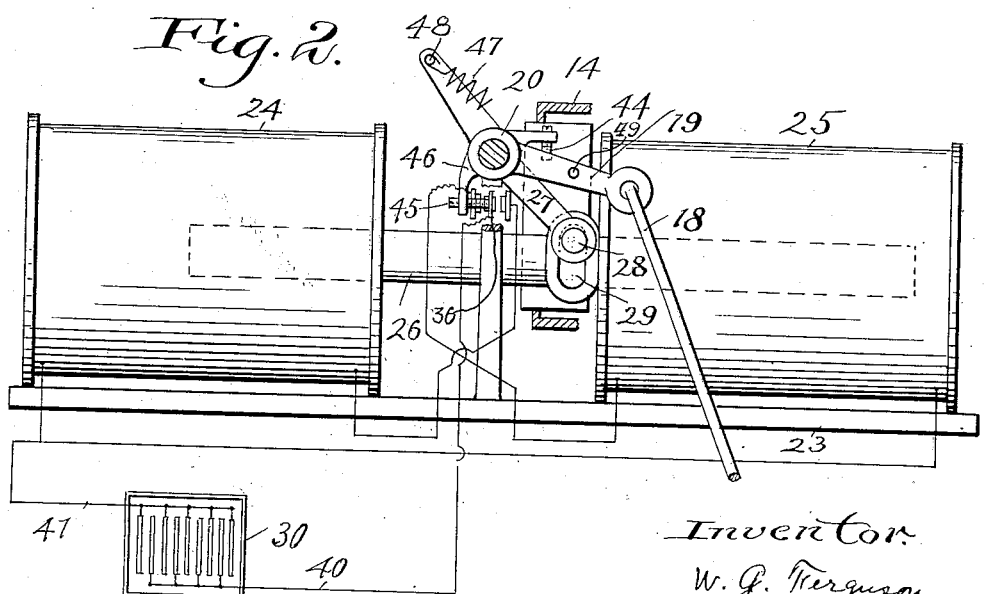

In the accompanying sheets of drawings wherein I have shown an embodiment of my invention which operates with high efficiency, Figure 1 is a plan view with parts in section of the principal elements of the controlling system; Fig. 2 is a side view of the same; and Fig. 3 is a view of an internal combustion engine shown somewhat conventionally, and equipped with my invention which is employed for keeping the temperature of the water in the engine cooling system within certain predetermined limits.

My invention may be employed to advantage with different types of apparatus for controlling the flow or temperature of medium such as a liquid or a gas which is caused to pass through a certain flow circuit or to a chamber or receiver, and although my invention is therefore not limited in its field of use to the controlling of the temperature of the water in an engine cooling system, in Fig. 3 I have illustrated my invention applied to an engine for that purpose.

Reference will first be had to this figure, and then to the details of the controlling device or system. In Fig. 3, 10 represents the body of an internal combustion engine such as are employed in automobiles; 11 represents the ordinary air cooled radiator, and 12 any suitable type of pump which circulates the water through the cooling system. Water is adapted to pass from the lower part of the radiator 11 to the pump by a pipe 12ª, and from the pump it is adapted to pass by a pipe 13 to the engine jacket, and from the outlet end of the latter to the top of the radiator. In this case, the engine is shown as provided at the top with a water header 14 to which the water passes after circulating through the engine jacket, this header being connected by a pipe 15 to the top of the radiator 11. It will be understood that ordinarily the water circulates from the pump through the pipe 13, through the jacket of the engine, through the header 14, pipe 15, through the radiator where the water is cooled, and by pipe 12ª again to the pump.

For the purpose of controlling the temperature of the water within the cooling system I provide between the pump 12 and pipe 13, a valve 16, and I provide a by-pass pipe 17 connecting the valve casing to the top of the radiator. When the temperature of the water in the system is normal or varies within predetermined limits, the valve allows the water to pass through the engine in the ordinary manner, but when the temperature of the engine and of the water in the circulating system falls below a predetermined point, the water of the cooling system is shunted by the valve and by-pass pipe 17 around the engine, and when the temperature rises to a predetermined point the valve is operated so as to stop the flow of water through the by-pass pipe and permit it to circulate through the engine jacket.

For the control of the flow, and hence the temperature of the engine, I employ in this case what may be termed a thermo-electric controlling system which will now be described. It will be observed that the valve has a lever arm 16ª (see Fig. 3) which is connected by a rod 18 to an arm 19 which is attached to a rock-shaft 20 of the controlling device, which as shown in Fig. 3 is arranged at the top of the engine adjacent the header 14. This rock-shaft 20 is rotatably supported in suitable bearings 21 and 22 on a base plate 23, and is designed to be shifted back and forth through an arc or angle of substantially 90° by two solenoids 24 and 25 suitably supported on the base plate 23, these solenoids having a horizontally disposed core 26 which is located below the rock-shaft 20. Rotary movement is transmitted to the rock-shaft 20 from the endwise movement of the core 26 by an arm 27 which is secured to the rock-shaft and has at its free end a pin 28 which engages in an elongated slot 29 of the core.

The current is supplied first to one solenoid coil and then the other as the temperature of the water in the cooling system or other circuit through which the medium flows when a physical condition of the medium, in this case the temperature, reaches certain high and low limits respectively by means of a battery 30 which may be the regular storage battery usually carried by an automobile (assuming that the invention is employed on an automobile for the purpose of maintaining the temperature of the water in the cooling system within the predetermined limits). Any other suitable source of electric current may be used as will be readily understood.

In this case the connections between the battery and the solenoid coils are controlled thermally by a thermostat which includes a chamber 31 with a tube 32 which extends into the water header 14. The details of this thermostat *per se* may be varied as desired, but preferably the chamber and tube contain a volatile liquid, the degree of volatilization and the pressure in the chamber and tube varying with the temperature. The chamber 31 has at its forward end a diaphragm 33, which is moved inward and outward by variations in pressure on the interior of the chamber, this diaphragm having in this case an outstanding pin 34 to which is connected at 35 a somewhat flexible elongated contact member 36 which is pivoted at 37, and near its free end has a contact point, or a pair of points adapted to move between a pair of stationary contacts 38 and 39 which may be supported in any suitable manner from the base plate, and the distance between which may be varied as circumstances require.

It will be observed that one side of the battery is connected by a conductor 40 to the movable contact member 36, and that the other side of the battery is connected by a conductor 41 to one terminal of each of the two solenoid coils 24 and 25. The second terminal or solenoid coil 24 is connected to the stationary contact member 38 by a conductor 42, and the second terminal or solenoid coil 25 is connected to the stationary contact member 39 by a conductor 43.

Normally, or when the temperature is within the certain predetermined limits, the movable contact 36 engages neither of the contacts 38 and 39, and there will be no flow of current from the battery. When, however, the temperature falls to the predetermined low point, the pressure in the thermostat chamber is reduced to an extent such as to cause, through the inward movement of the thermostat diaphragm, a shifting of the movable contact 36 so as to bring the contact point carried thereby into engagement with the stationary contact 39. This closes the circuit through the solenoid coil 25 and immediately the core is moved to the right as viewed in Fig. 1, shifting the valve so as to by-pass the water of the cooling system around the water jacket, and to stop the flow of the cooling water into the header into which the thermostat projects.

When the temperature in the cooling system rises to the predetermined point such that by the outward movement of the diaphragm the contact member 36 is caused to engage the contact member 38, the solenoid coil 24 is energized, the core is shifted in the opposite direction, and the valve is operated so as to allow the water to circulate through the circulating system of the engine including the header in which the thermostat is located.

If the movable contact member were permitted to remain in engagement with either of the stationary contacts after the energization of the corresponding solenoid coil, there would be a long continued and useless waste of electrical energy. I therefore provide means for breaking the circuit immediately after either coil is energized, and immediately after the throw of the solenoid core is completed, and I accomplish this in such a way as to break the circuit quickly, thus minimizing sparking at the contacts. This is accomplished in this case by two adjustable breaker points 44 and 45, which as here shown, are adjustably mounted in the ends of a bell-crank lever 46 which is secured to the rock-shaft 20 (see Figs. 1 and 2). These points are so positioned that at the end of the throw of the core to the left, breaker point 44 strikes the movable contact blade 36 and shifts it out of engagement with stationary contact 38 and at the completion of the throw of the core to the right, through the energization of coil 25 breaker point 45 strikes the blade 36, shifting it out of engagement with stationary contact 39. This break takes place quickly, as before stated, so that the sparking at the contacts is not at all serious. It is, of course, necessary to adjust the breaker points so that in shifting the contact blade out of engagement with one stationary contact member it will not be moved far enough to engage the opposite stationary contact. Thus each solenoid coil is deënergized immediately after its energization and immediately after the completion of the travel of the core.

To avoid possibility of the core moving accidentally out of its normal position and thus causing an undesired shifting of the valve, means are provided for holding the core and the parts associated therewith to the positions to which they were shifted by the solenoid coil when energized. The means for accomplishing this, as here shown, includes a spring 47, which at one end is connected to a stationary pin 48 carried by the bearing 21, and connected at its other end to a pin 49 secured to the lever 19 which is connected to the rod 18 leading to the valve. This spring and the points of attachment to the pins 48 and 49 are so related that in the movement of the arm 19 from one position to the other, the spring passes beyond the dead center, which is the axis of the rock-shaft 20, so that the spring holds the parts in the positions to which they are thrown by the solenoid coils.

As before stated, the use of the invention on an internal combustion engine for controlling the temperature of the water in the cooling system is only one of the purposes for which the invention may be utilized. In fact, it is not necessarily confined to controlling the flow or temperature of water, but may be employed under certain circumstances for controlling the flow or temperature of a gas, and it is not necessary that the electrical features of the control system be controlled directly by certain variations in temperature, as a change in some other physical condition of the medium being controlled, such as pressure, may be utilized to cause the proper movement of the contact blade 36.

Having thus described my invention, what I claim is:

1. In combination with a circulation system or circuit and a valve for controlling the same, of an electrically operated device for controlling the valve comprising a movable member connected to the valve, electromagnetic means for shifting said member, movable and stationary contact members for said electro-magnetic means, a member responsive to a change in the physical condition of the medium passing through said circulation system or circuit for shifting the movable contact member so as to complete the electric circuit through the electro-magnetic means, and separate means for opening the circuit immediately after the contact members are brought into engagement through the action of said member.

2. In combination with a circulation system or circuit and a valve for controlling the same, of a thermo-electric system of control for the valve comprising a movable member for shifting the valve, electro-magnetic means for shifting said member, movable and stationary contact members for said electro-magnetic means, a thermostat in position to be affected by the temperature of the medium in the circulation system or circuit for shifting the movable contact member into engagement with the stationary contact member, and separate means for separating the contact members immediately after being brought into engagement by the thermostat.

3. In combination with a circulation system for a medium, a thermostat positioned with respect to a part of said system so as to be responsive to the temperature of the medium flowing therethrough, a by-pass for a portion of this system, a valve for controlling the flow of the medium through or around said portion of the system, a valve shifting member, a solenoid for shifting said member, movable and stationary contact members for controlling the circuit through said solenoid, the movable contact member being operatively connected to the thermostat and adapted to be shifted into engagement with the stationary contact member by the latter, and means for separating said contact members so as to break the circuit through the solenoid when the valve is shifted.

4. In combination with a circulation system for a medium, a valve for controlling the same, a valve shifting member, a pair of solenoids for shifting said member in opposite directions, means comprising movable and stationary contacts and a thermostat responsive to changes of temperature of the medium in the circulating system for completing an electric circuit through each solenoid, separate means for causing the deënergization of each solenoid, and means for holding said valve shifting member in the position to which it was shifted by either solenoid after the deënergization thereof.

5. In combination with a circulation system for a medium and a valve for controlling the same, a valve shifting member, two solenoids for shifting said member in opposite directions, a pair of stationary contacts and a movable contact between the same for causing the energization and deënergization of each solenoid, a thermostat in heat conducting relationship with said circulation system and connected to the movable contact so as to shift the same into engagement first with one stationary contact and then with the other when the temperature of the medium reaches high and low predetermined limits, and separate means for shifting the movable contact out of engagement with either stationary contact immediately after the energization of the corresponding solenoid.

6. In combination with a circulation system for a medium and a valve for controlling the same, a valve shifting member, two solenoids for shifting said member in opposite directions, a pair of stationary contacts and a movable contact between the same for causing the energization and deenergization of each solenoid, a thermostat in heat conducting relationship with said circulation system and connected to the movable contact so as to shift the same into engagement first with one stationary contact and then with the other when the temperature of the medium reaches certain high and low predetermined limits, separate means for shifting the movable contact out of engagement with either stationary contact immediately after the energization of the corresponding solenoid, and means for holding said valve shifting member in the position to which it was shifted by either solenoid immediately after the deënergization of the solenoid.

In testimony whereof I hereunto affix my signature.

WILLIS G. FERGUSON.